United States Patent
Rodriguez Ordas

(10) Patent No.: US 11,389,905 B2
(45) Date of Patent: Jul. 19, 2022

(54) DOUBLE FIBRE LASER CUTTING SYSTEM

(71) Applicant: TECOI CORTE, S.L., Leon (ES)

(72) Inventor: Jorge Luis Rodriguez Ordas, Leon (ES)

(73) Assignee: TECOI CORTE, S. L., Sahelices de Sabero (ES)

( * ) Notice: Subject to any disclaimer, the term of this patent is extended or adjusted under 35 U.S.C. 154(b) by 409 days.

(21) Appl. No.: 16/314,629

(22) PCT Filed: Jul. 29, 2016

(86) PCT No.: PCT/ES2016/070580
§ 371 (c)(1),
(2) Date: Dec. 31, 2018

(87) PCT Pub. No.: WO2017/191336
PCT Pub. Date: Nov. 9, 2017

(65) Prior Publication Data
US 2019/0314936 A1     Oct. 17, 2019

(51) Int. Cl.
*B23K 26/38* (2014.01)
*B23K 26/04* (2014.01)
(Continued)

(52) U.S. Cl.
CPC .............. *B23K 26/38* (2013.01); *B23K 26/04* (2013.01); *B23K 26/048* (2013.01); *B23K 26/0604* (2013.01); *B23K 26/0876* (2013.01)

(58) Field of Classification Search
CPC ...... B23K 26/38; B23K 26/04; B23K 26/048; B23K 26/0604; B23K 26/0876
See application file for complete search history.

(56) References Cited

U.S. PATENT DOCUMENTS

2006/0157457 A1* 7/2006 Sakurai .................. B23K 26/21
219/121.76
2008/0018943 A1* 1/2008 Eyal .................... B23K 26/0608
358/3.29
(Continued)

FOREIGN PATENT DOCUMENTS

CA    2242139 A1 * 12/1999 ......... B23K 26/0608
CN    103751534 U    8/2014
(Continued)

OTHER PUBLICATIONS

Microstep Spain, Publication, Laser De Fibra, El Futuro Inmediato, Dec. 4, 2014, Six Pages.

*Primary Examiner* — Dana Ross
*Assistant Examiner* — Joe E Mills, Jr.
(74) *Attorney, Agent, or Firm* — William H. Honaker; Dickinson Wright PLLC

(57) ABSTRACT

A double fibre laser cutting system for laser cutting sheet metal that comprises: a cutting machine with a mobile gantry and fixed metal sheets, multiple heads both for straight cutting and bevel cutting, multiple cutting sources in each head, automated means for changing the cutting source in each head, means for controlling all the elements, wherein the multiple cutting sources in each head is carried out by means of two fibres sent from corresponding generator outlets to each head. The simultaneous cutting of one or more metal sheets with different thicknesses is achieved and, consequently, maximum laser cutting capacity in useful length, and in useful width, the use of a single generator, and the automatic adjustment of cutting conditions in accordance with the thicknesses, straight and bevel cutting simultaneously in multiple heads.

4 Claims, 7 Drawing Sheets

(51) Int. Cl.
*B23K 26/06* (2014.01)
*B23K 26/08* (2014.01)

(56) References Cited

U.S. PATENT DOCUMENTS

2016/0059349 A1\* 3/2016 Sercel .................. B23K 26/402
 65/32.1
2016/0074961 A1\* 3/2016 Schindhelm ....... B23K 26/1462
 219/121.83

FOREIGN PATENT DOCUMENTS

CN 104475971 A 4/2015
CN 104889564 A 9/2015

\* cited by examiner

DOUBLE FIBRE LASER CUTTING SYSTEM

CROSS-REFERENCE TO RELATED APPLICATION

The present invention claims priority to PCT International Patent Application Serial No. PCT/ES2016/070580 filed Jun. 29, 2016 entitled "Double-Fibre Laser Cutting System," the entire disclosures of the applications being considered part of the disclosure of this application and hereby incorporated by reference.

DESCRIPTION

The object of the present invention, as established in the title of the invention, is a double fibre laser cutting system, particularly a sheet metal laser cutting system that uses a multitude of cutting fibres for laser cutting heads.

The present invention is characterized in that, through the use of a multitude of cutting fibres and their characteristics associated with more powerful generation means, it is possible to cut one or various metal sheets having different thicknesses, without need to modify the optical configuration of the head.

Therefore, the cutting system makes it possible to achieve maximum laser cutting capacity in terms of useful length, in addition to useful width, the use of a single generator and the automatic adjustment of cutting conditions in accordance with cutting thicknesses, for both straight and bevel cutting.

Therefore, the present invention falls within the sphere of sheet metal laser cutting machines, in addition to that of the heads used for said cutting and particularly the use of multiple fibres to obtain the best cutting features in different thicknesses without need for the operator to modify the optical configuration.

Laser cutting is currently positioned as an essential technique in the sheet metal cutting market. This technique achieves excellent cutting quality, with maximum use of the material, and high cutting speed.

The different machine manufacturers that incorporate laser cutting technology use cutting generators from various generator suppliers which share the market between them.

Machine manufacturers that do not manufacture their own generators are considered "OEMs" (Original Equipment Manufacturers).

The other manufacturers integrate the cutting source and all of its associated elements.

The following processes intervene in sheet metal processing for the manufacture of large parts:
  Identification for traceability
  Thermal cutting
  Edge beveling
  Drilling
  Thread tapping
  Countersinking
  Roller bending
  Welding
  Etc.

Laser cutting machines have been traditionally limited to two of the processes, identification and thermal cutting.

Some manufacturers have incorporated bevel cutting as the latest innovation, thereby adding a process at greater.

Due to technical limitations, to date laser cutting has been used in a very low range of thicknesses. Until recently, various generators had to be incorporated in order to have more than one cutting head in a single machine.

The current trend, in view of the appearance of more powerful cutting sources, is to increase the range of thicknesses susceptible to laser cutting.

Additionally, new generators have recently appeared on the market, which offer various outlets, making it possible to cut with various heads as of a single source.

This trend is at an initial stage and has the following drawbacks:
  Components associated to very high-power laser cutting sources have not yet been developed to reach high levels of functionality. They are currently developed at a very simple level, solely focusing design efforts on the optimization of optical devices, so they can resist the greatest possible power.
  Technically, it is complex to adapt the heads and their working parameters to each new thickness of the sheet metal to be cut.
  Functionally, it is not very effective and highly complex to change from one cutting thickness to another in a single machine when the difference is greater than 3 mm.

Therefore if small, medium and large thicknesses are to be cut in a single machine, there must be at least three different optical-mechanical configurations for each head.

If different ranges of sheet metal thickness are to be cut, it is a terribly arduous task when changing optical-mechanical configurations.

As a result, customers with greater capacity usually purchase various identical machines and dedicate them to specific tasks, adapting each to a range of sheet metal thicknesses, thereby avoiding the previously described reconfiguration tasks.

Therefore, the object of the present invention is to develop a cutting system that makes it possible to cut different sheet metal thicknesses in a single machine, in which it is not necessary to adapt the heads and their working parameters to each new sheet metal thickness to be cut, i.e. that does not require changing the optical-mechanical configurations, developing a cutting system with multiple heads and multiple fibres such as that described below and which is set out in its essentiality in claim one.

DESCRIPTION OF THE INVENTION

The object of the present invention is to develop a cutting system that enables the use of multiple sources as of a single laser generator wherein it is possible to vary the laser emission characteristics in real time, in accordance with the cut to be made at any given time.

Therefore, the system, in particular the cutting machine, will have various heads automatically adaptable to the cutting conditions in all ranges of thickness and usual materials in real time, without need for the intervention of the machine operator.

The machine of the proposed cutting system will be a machine having a mobile gantry and fixed metal sheets, with large dimensions in terms of useful working width and length, which has multiple cutting heads and multiple cutting sources in each head, namely fibres, where free access to the workbench is possible from the sides, which implies ease of loading and unloading, wherein the machine may also have an automated system for loading sheet metal and evacuating waste and cut pieces, a system for covering and protecting the guiding and traction means ad an automated sheet metal recognition system, in addition to automated control of height above corrugated sheet metal, and control means that unify the operation of all the elements.

The machine will have a modular design adequate to the limitations of weight and volume for transport and installation thereof.

In order to cut different ranges of sheet metal thickness with each head, different optical configurations are required that can easily adapt the focalization of the laser beam on the sheet metal during cutting.

A single, completely automated head for different ranges of thickness has not been used on a commercial scale to date due to the great automation complexity it would entail when making optical readjustments for each new focalization mode, when switching from one range of thicknesses to another.

Therefore, the invention seeks to develop a new method for varying beam focalization conditions, without having to replace the lens packet to obtain the best cutting features in different sheet metal thicknesses.

The method consists of installing two fibres from corresponding generator power outlets to each head, each fibre having a different inner diameter, thereby sending the cutting beam from the generator to the head through one fibre or another.

By sending the beam through fibres with a smaller inner diameter, beam diameter can be varied upon impacting on the focal lens, and have a larger diameter when sent through fibres with a larger diameter and vice versa.

In order to achieve the foregoing functionality, the system must have:
Parameterisable, switchable fibre outlets in the generator.
Double switchable collimator.
Optics composed of dichroic and reflective mirrors with monitored absorber, on a refrigerated mount, under a pressurized atmosphere.
Optical head fed by cutting gases.
Integrated capacitive height control.

Once the physical elements of the assembly are built, specific nozzles and cutting tables must be developed by testing diameters, flow rates and cutting gas pressures, in accordance with piercing delays and cutting speeds specific to each material and thickness.

Once the cutting tables have been created and introduced in the software, the exchange between fibres and collimators must automated, together with the regulation of powers and pulsation frequencies in the generator, in order to achieve different laser beam states in the piercing cycle, cutting cycle and even in surface marking, in accordance with the desired qualities.

Monitoring of the optical chamber requires the design and manufacture of our own detectors due to the absence of usable commercial elements.

The optical handling of a high-power laser beam entails risks that must be supervised and monitored as process alerts within the automation of the machine.

The main risks in the processing chamber are as follows:
Breakage of mirrors (usually due to thermal shock or deterioration of the reflective coating).
Delocalized direct radiation.
Diffuse radiation perimetral to the beam.

A radiation absorber based on thermal saturation has been designed to detect adequate radiation of the laser inside the chamber, monitored by temperature and with forced refrigeration.

The integration of the assembly in the mobile mechanics of the head makes it necessary to redesign it, in its two versions; straight cutting and bevel cutting.

In order to achieve a system such as that described, the machine's mechanics were designed to adapt the assembly's dimensions to the new requirements; in particular, the laser cutting heads and their different components.

The system comprises control means based on the combination of three programming environments:
A control software comprising the mathematical functions integrated for the calculation of compensated trajectories, nesting or automated nesting, adapted CAD, specific peripheral management subroutines, post-processors adapted to other software, etc.
A man-machine software interface comprising the environment graphic design of screens, drop-down menus, parameter tables, buttons, icons, versions in multiple languages, etc.
A communications software comprising programs for management of automaton and environment elements, such as field Bus, optical fibre, proportional valves, diagnosis management, etc.

The advantages derived from the system thus described are:
Maximum laser cutting capacity in useful length.
Maximum laser cutting capacity in useful width.
Multiple laser cutting heads with the same source.
Simultaneous straight cutting in multiple heads.
Simultaneous bevel cutting in multiple heads.
Automatic adjustment of cutting conditions in accordance with thicknesses.

In the description and claims, the word "comprises" and its variants do not aim to exclude other technical characteristics, additives, components or steps. For the persons skilled in the art, other objects, advantages and characteristics of the invention will be partly inferred from the description and partly from the practice of the invention.

In order to complement the description being made and with the object of helping to better understand the characteristics of the invention, in accordance with a preferred practical embodiment thereof, said description is accompanied, as an integral part thereof, by a set of drawings where, in an illustrative and non-limiting manner, the following has been represented:

In light of the figures, following is a preferred embodiment of the proposed invention.

Figure 1:
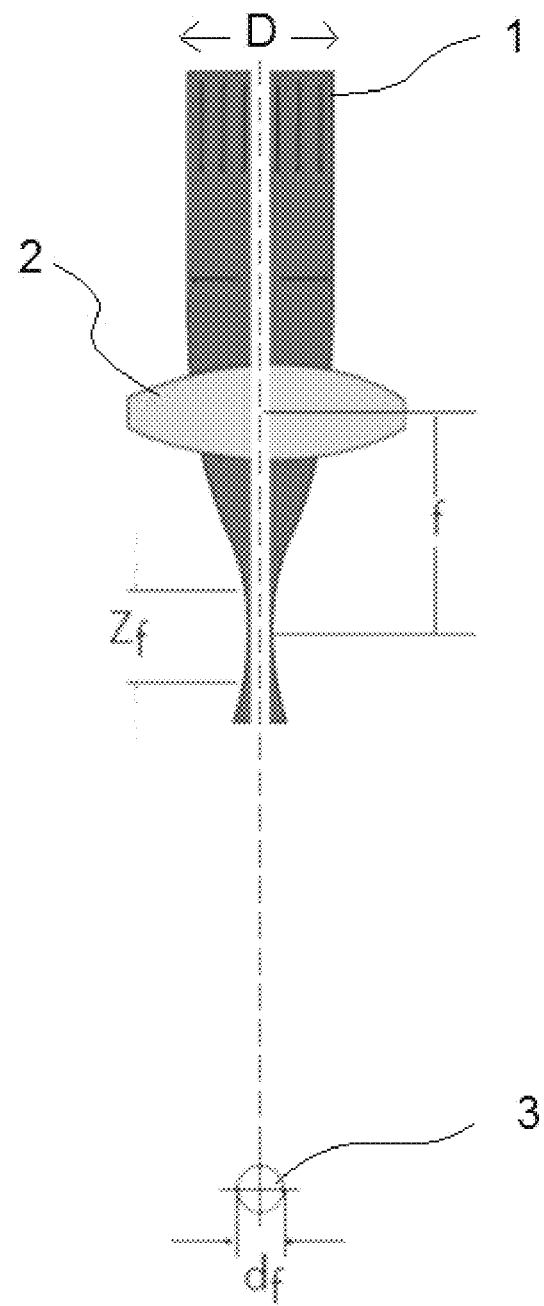
FIG. 1 shows a representation of the parameters that intervene in the cutting of the thin sheet metal.
Figure 2:
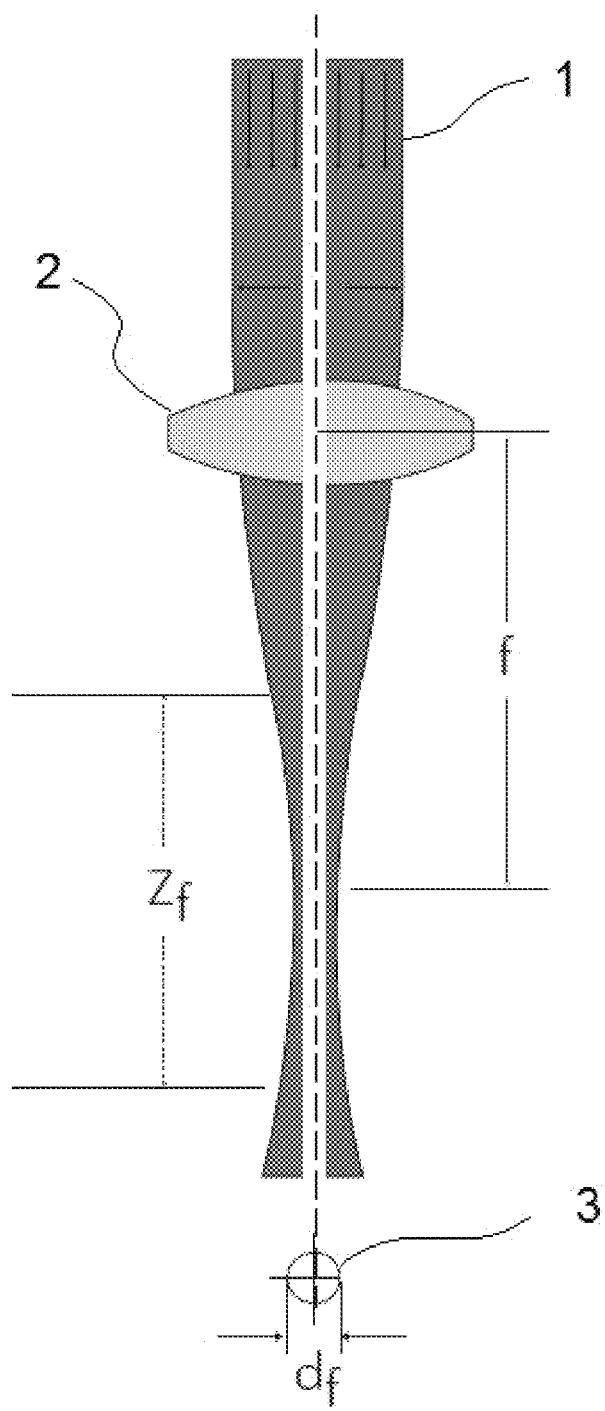
FIG. 2 shows the parameters that intervene in the cutting of thick sheet metal.

FIGS. 1 and 2 show the basic parameters for cutting thin and thick metal sheets, respectively. It shows the arrival of a laser beam (1) with a diameter (D) to a focal lens (2) and which, in accordance with the focal distance (f) and the focal zone (Zf), produces a cut or spot (3) of a certain diameter (df).

The effect pursued is that of obtaining different focal zones with a larger or smaller spot size by modifying the focal distance (f) and the diameter of the laser beam (D) instead of modifying the focal lens.

Figure 3:
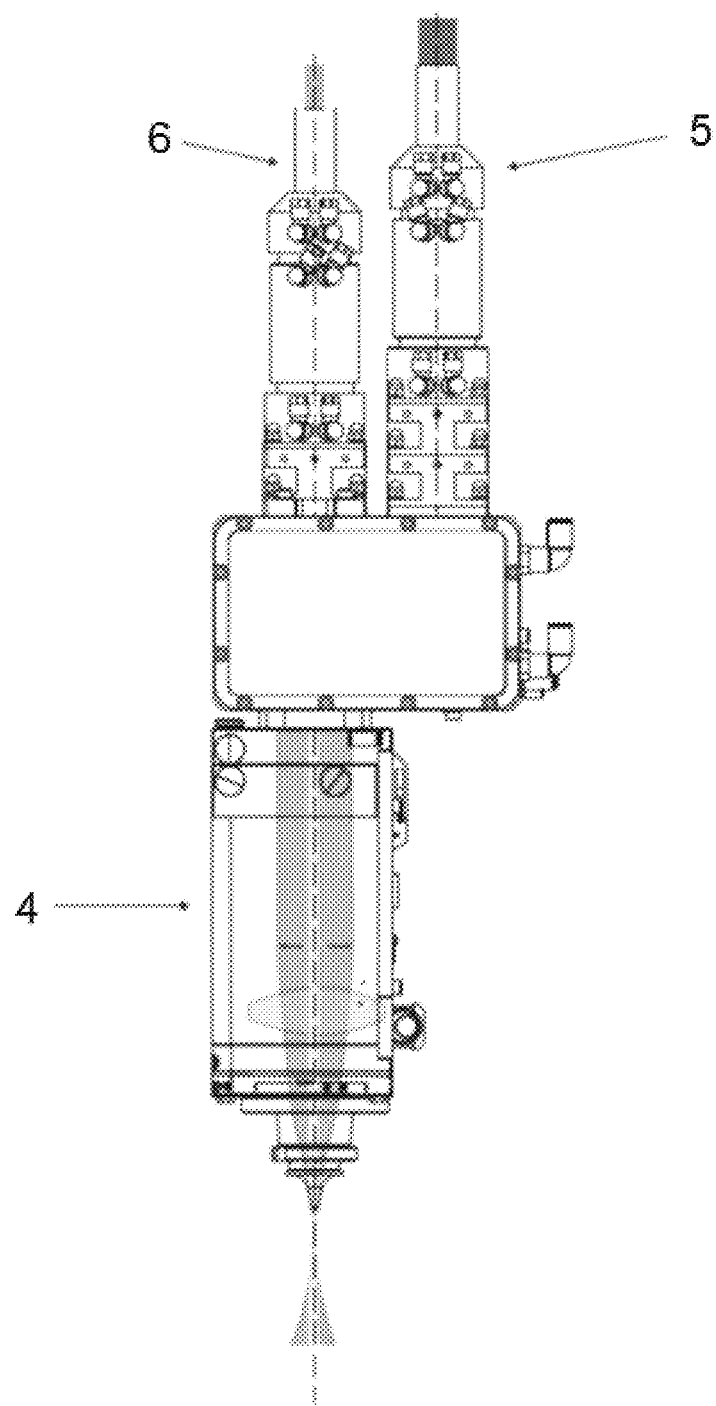
FIG. 3 shows a head equipped with the double fibre system such as that which is the object of the invention.

FIG. 3 shows the solution adopted to obtain a machine that can cut different ranges of sheet metal thicknesses using a machine with various heads, wherein each head (4) has a double inlet, i.e. with two inlets for fibres of different sizes, a larger fibre (5) and another inlet with a smaller fibre (6) wherein the fibres are sent from corresponding generator outlets up to each head, wherein each fibre has a different inner diameter, which enables the cutting beam to be sent from the generator to the head, through one fibre or another.

By sending the beam through fibres with a smaller inner diameter, it is possible to vary the diameter of the beam upon inciding on the focal lens, being of a larger diameter when sent through fibres of larger diameter and vice versa.

Figure 4:
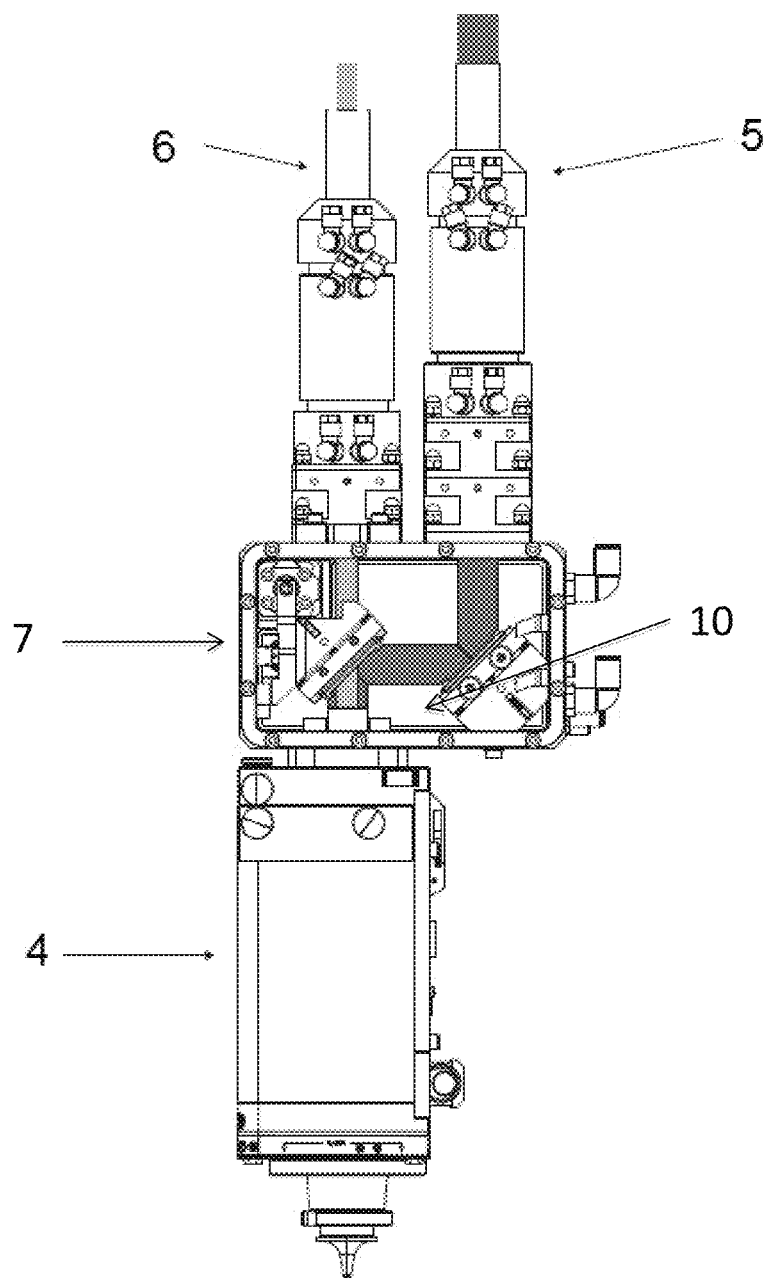
FIG. 4 shows a view of the optical chamber of a head equipped with the system of the invention.
Figure 5:
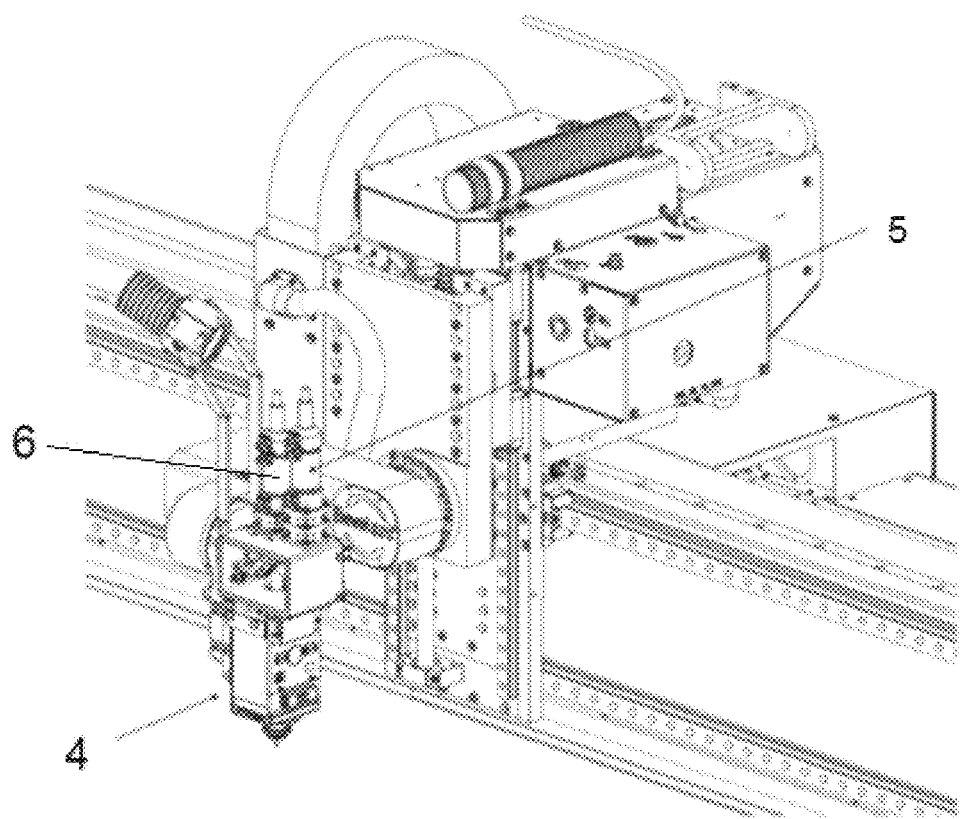
FIG. 5 shows a representation of a complete laser cutting head integrated in a machine with the system of the invention.
Figure 6:
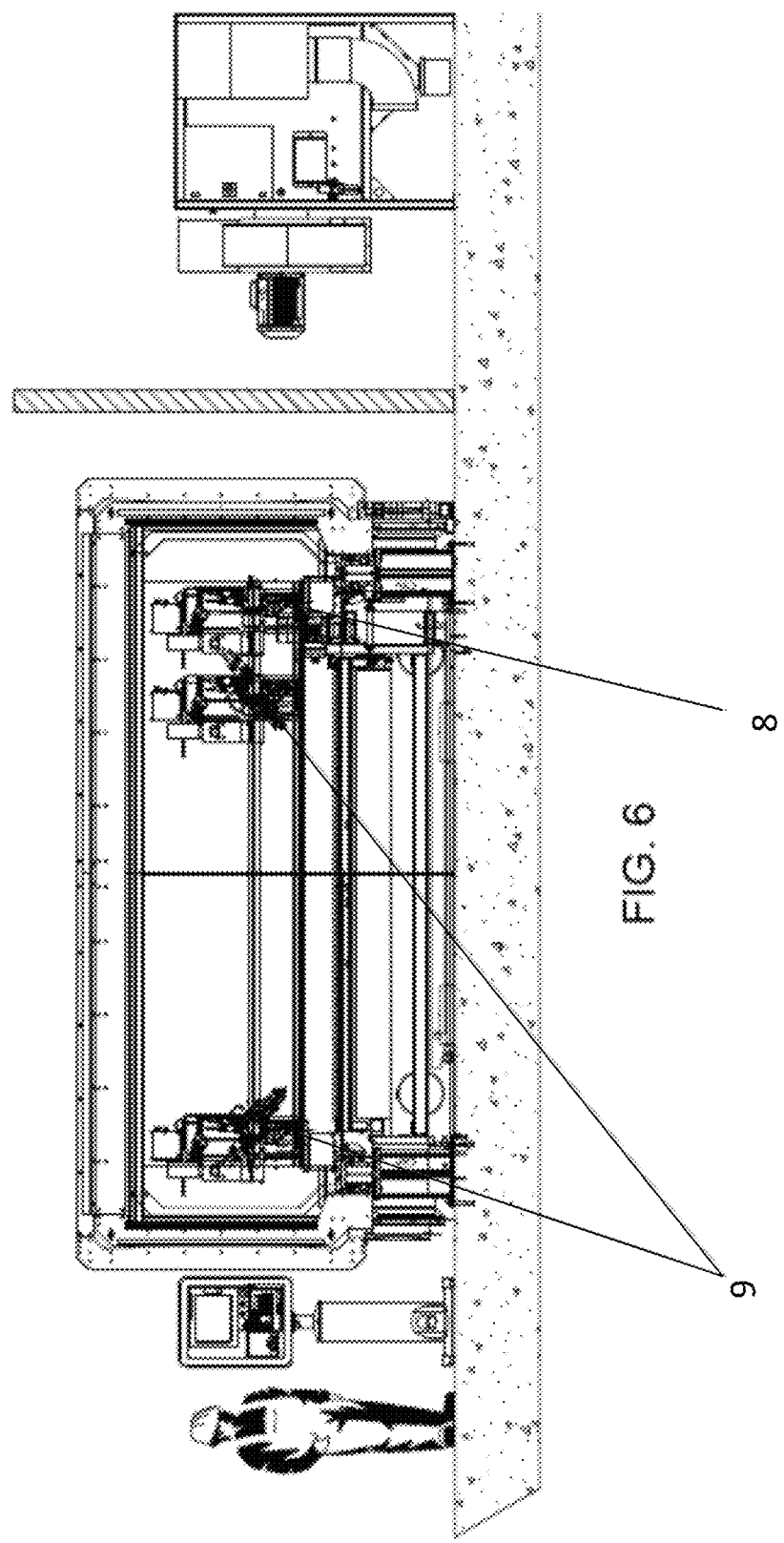
FIGS. 6 and 7 show a frontal and perspective view, respectively, of the machine of the laser cutting system, wherein various straight and bevel cutting heads can be observed, equipped with the system of the invention.
Figure 7:
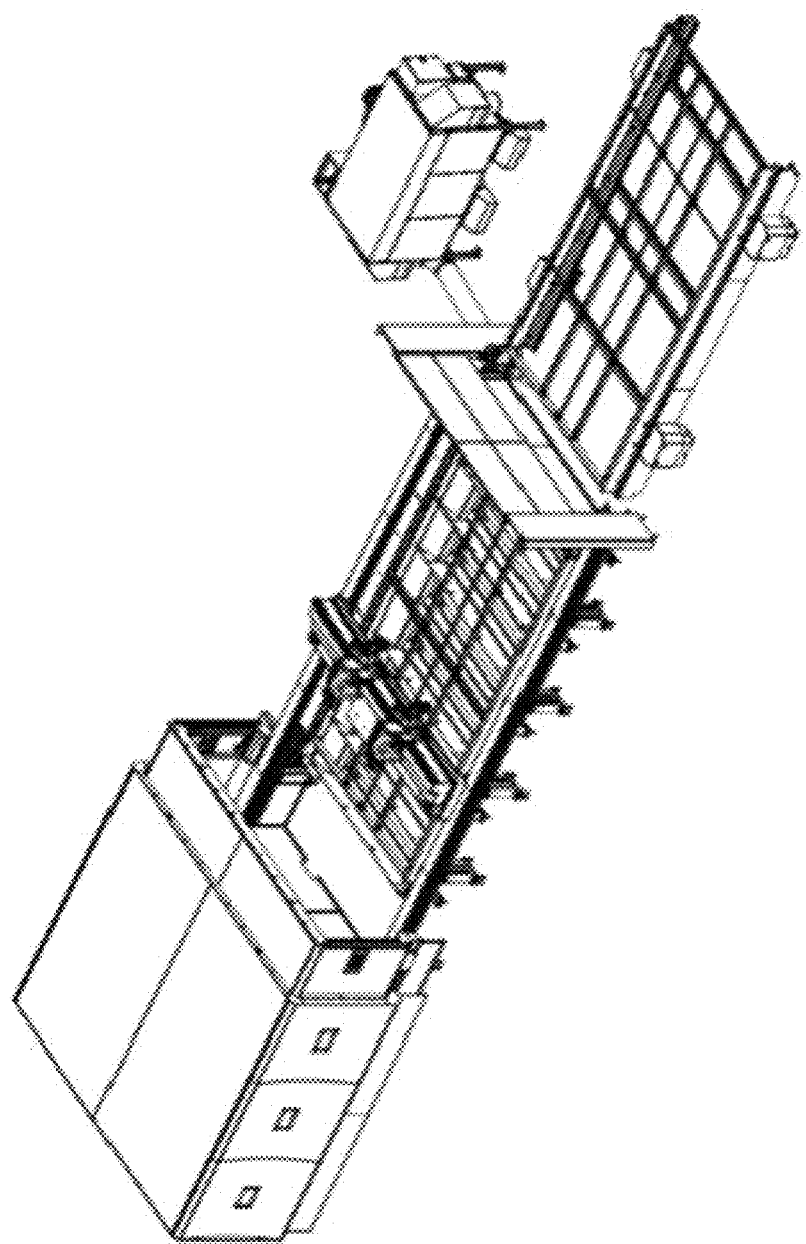

FIG. 4 shows a cutting head with arrival fibres (5) and (6) and wherein the optical chamber (7) of the head can be observed.

Therefore, the multiple-head cutting system is characterized in that it comprises:

A cutting machine with a mobile gantry and fixed metal sheets.

Multiple heads for both straight cutting (8) and bevel cutting (9).

Multiple cutting sources in each head.

Laser generation means having various, switchable fibre outlets controlled by a finite set of parameters.

Means for controlling all the elements.

The heads are equipped with automated cutting source switching in each head.

The multiple cutting sources in each head are obtained by means of two fibres sent from corresponding generator outlets to each head.

Additionally, it may comprise:

An automated sheet metal loading system.

An automated sheet metal recognition system.

An automated system for controlling the height above the corrugated metal sheets.

Having sufficiently described the nature of the present invention, in addition to the manner in which to put it into practice, it is hereby stated that, within its essentiality, it may be put into practice in other embodiments that differ in detail from that indicated by way of example, and to which the requested protection applies, provided that its main principle is not altered, changed or modified.

The invention claimed is:

1. A double fibre cutting system for laser cutting sheet metal comprising:

A cutting machine having a mobile gantry and fixed metal sheets,

Multiple heads for both straight cutting (8) and bevel cutting (9),

Multiple cutting sources in each cutting head (4),

Laser generator including switchable fibre outlets controlled by a set of parameters for cutting thin and thick metal sheets, namely:

diameter (D) of the laser beam, focal distance (f) of the laser beam, focal zone (Zf) of the laser beam, and diameter (df) of the cut or spot (3) to be produced, An optical chamber (7) to which arrival fibres (5) and (6) are connected and the optical chamber is in connection with in each cutting head (4), wherein the cutting heads (4) are equipped to automatically switch the multiple cutting sources in each head, and wherein the arrival fibres (5) and (6) each have a different inner diameter.

2. The double fibre cutting system, according to claim 1, wherein the multiple cutting sources in each head is performed by two fibres sent from corresponding generator outlets to each head.

3. The double fibre cutting system, according to claim 1, including

An automatic sheet metal loading system,

An automatic sheet metal recognition system,

An automated system for controlling height between the laser head and sheet metal.

4. The double fibre cutting system, according to claim 1 wherein each head (4) has an optical chamber with a radiation absorber (10) disposed inside the chamber.

* * * * *